United States Patent [19]

Reischl et al.

[11] 4,182,828

[45] Jan. 8, 1980

[54] PRODUCTION OF SOLUTIONS OR DISPERSIONS OF POLYISOCYANATE POLYADDITION PRODUCTS CONTAINING URETHANE AND/OR UREA GROUPS AND CONTAINING BOTH ANIONIC AND CATIONIC GROUPS

[75] Inventors: Artur Reischl, Leverkusen; Wolfgang Wenzel, Bergisch-Gladbach, both of Fed. Rep. of Germany

[73] Assignee: Bayer Aktiengesellschaft, Leverkusen, Fed. Rep. of Germany

[21] Appl. No.: 900,690

[22] Filed: Apr. 27, 1978

[30] Foreign Application Priority Data

May 14, 1977 [DE] Fed. Rep. of Germany ....... 2721985

[51] Int. Cl.² .............................................. C08G 18/38
[52] U.S. Cl. ...................................... 528/69; 428/425; 528/71
[58] Field of Search ..................... 528/71, 69; 428/425

[56] References Cited

U.S. PATENT DOCUMENTS

| | | | |
|---|---|---|---|
| 3,036,998 | 5/1962 | Rudner | 528/71 |
| 3,479,310 | 11/1969 | Dieterich et al. | 260/29.4 R |
| 3,686,108 | 8/1972 | Reiff et al. | 260/29.2 TN |
| 3,988,268 | 10/1976 | Dietrich et al. | 528/71 |

*Primary Examiner*—Maurice J. Welsh
*Attorney, Agent, or Firm*—Gene Harsh; Lawrence S. Pope

[57] ABSTRACT

This invention relates to a process for the production of new, non-foamed urethane and/or urea group-containing polyisocyanate polyaddition products which contain both cationic and also anionic groups chemically bound into the same molecule of said polyisocyanate polyaddition products, to the polyaddition products obtainable by this process and to the use thereof for coating flexible and non-flexible sheet-form materials.

14 Claims, No Drawings

PRODUCTION OF SOLUTIONS OR DISPERSIONS OF POLYISOCYANATE POLYADDITION PRODUCTS CONTAINING URETHANE AND/OR UREA GROUPS AND CONTAINING BOTH ANIONIC AND CATIONIC GROUPS

BACKGROUND OF THE INVENTION

Processes for the production of ionically-modified polyisocyanate polyaddition products containing urethane and/or urea groups are known and are described, for example, in the following literature references:

DT-PS No. 880,485, DT-AS No. 1,044,404, US-PS No. 3,036,998,

DT-PS No. 1,178,586, DT-PS No. 1,184,946, DT-AS No. 1,237,306,

DT-AS No. 1,495,745, DT-OS No. 1,595,602, DT-OS No. 1,770,068,

DT-OS No. 2,019,324, DT-OS No. 2,035,732, DT-OS No. 2,446,440,

DT-OS No. 2,345,256, DT-OS No. 2,345,257, DT-OS No. 2,427,274,

US-PS No. 3,479,310, U.S. Pat. No. 3,686,108, and Angewandte Chemie 82, 35 (1970).

The processes described in these literature references are based on the principle of incorporating ionic groups in a macromolecular chain of a polyurethane-polyurea molecule by means of certain diols introduced into the prepolymer or by means of modified amines acting as chain-extenders for the prepolymers of which each contains at least two terminal NCO-functions. The continuous phase of the known polyurethane dispersions is either water, water-organic solvent in admixture or a pure organic medium, for example a solvent or a polyether or polyester polyol. Standard commercial-grade ionic dispersions are either anionic or cationic dispersions having all the known advantages and disadvantages of the respective ionic groups. Thus, cationic dispersions, for example, have excellent adhesion properties on a variety of different materials, but show relatively low electrolyte and storage stability by comparison with anionic dispersions. Now, it would be of considerable interest to combine the desirable properties of both differently charged systems. There has been no shortage of attempts in this direction.

The most obvious approach to combining the advantageous properties inherent in the two different systems, for example by mixing aqueous dispersions of anionic polyurethanes with aqueous dispersions of cationic polyurethanes, is frustrated by the incompatibility thereof which is mentioned, for example, in DT-OS No. 1,237,306, in DT-OS No. 1,570,602 and in DT-OS No. 2,141,807. It is only possible by using a water-miscible organic solvent, in which some of the solid constituents are soluble, that it is possible in some cases to form a staole system of separately produced cationic and anionic dispersions (DT-OS No. 2,427,247).

It is also known that polyurethanes may be ionically cross-linked by forming an ionic cross-linking system, which, in the case of aqueous polyurethane dispersions, is obtained by inner salt formation between groups capable of salt formation, such as tertiary nitrogen atoms incorporated in a macromolecular chain and free acid groups (DT-AS No. 1,237,306; GB-PS No. 1,076,688; DT-OS No. 1,495,847). As might be expected, this cross-linking effect increases the strength and elasticity of the corresponding end products.

There are also processes for producing polyurethanes having betaine structures which may either be left as such or converted, by reaction with inorganic or organic bases, into salts of polyurethanes having anionic properties or even by reaction with quaternizing agents or acid salt-formers, according to requirements, into salts of polyurethanes having cationic properties (DT-AS No. 1,237,306; DT-OS No. 2,237,114; DT-OS No. 2,536,678; US-PS No. 3,903,032; US-PS No. 3,997,490 and Angewandte Chemie 82, 53 et seq (1970).

It is not possible to obtain the required combination of properties using the ionic polyurethanes containing differently charged ion centers, preferably dispersed in water, which are described in the above literature references. The reason for this would appear to be the intensive interaction of the differently charged ion groups within the betaine structure which partly mask the properties associated with the type of ion. In general, a solution to this problem is regarded as basically impossible because, for example, the stable formation combination of cationic and anionic aqueous dispersions itself encounters insurmountable difficulties and may only be achieved in some cases with the assistance of water-compatible organic solvents.

However, it has now surprisingly been found that it is quite possible to synthesize ionic, non-foamed urethane and/or urea group-containing polyisocyanate polyaddition products which contain both cationic and also anionic groups chemically bound into the same molecule of said polyisocyanate polyaddition products, which are soluble or dispersible in water and/or organic solvents or dispersants and which also combine the known advantages of known anionic and cationic polyurethanes. The polyaddition products which have been discovered in accordance with the present invention are neither ionically cross-linked products nor betaine-like systems; instead they are genuine ampholytes whose properties are determined both by the anionic and also by the cationic groups. Contrary to all expectations, it has also been found that, although these ampholytes according to the present invention are hydrophilic to the extent required for dispersion in water, they are nevertheless so hydrophobic after application that they are distinguished from films of analogous, purely cationic or purely anionic dispersions by the particularly low degree of swelling thereof in water. In this respect, they also differ in particular from films of betaine-containing dispersions which are in fact inferior in the resistance to water thereof to films of anionic or cationic dispersions. Surprisingly, the polyaddition products according to the present invention are also far more suitable than, for example, dispersion mixtures of separately produced anionic and cationic products containing dimethyl formamide, for the coagulation process according to DT-OS No. 1,270,276; DT-OS No. 1,694,171; DT-OS No. 2,345,256 or DT-OS No. 2,427,274, because they have a far less adverse effect upon the technically important operation of washing out the organic solvent than the homogeneous dispersions of the prior art. The organic solvent, for example dimethyl formamide, may be washed out substantially quantitatively using significantly less water in a single washing operation, which is not possible with coagulation auxiliaries of above mentioned dispersion mixtures.

In addition, aqueous dispersions of the polyaddition products according to the present invention show excellent adhesion on a variety of different materials, such as glass, metal, plastics, textiles and leather, by virtue of the presence therein of cationic groups. At the same time, the electrolyte stability thereof is several times higher than that of analogous, purely cationic dispersions by virtue of the anionic group content thereof.

SUMMARY OF THE INVENTION

The present invention relates to a process for the production of non-foamed urethane and/or urea group-containing polyisocyanate polyaddition products, in which chemically fixed anionic and chemically fixed cationic groups are simultaneously present, by reacting:
 (a) organic polyisocyanates, optionally together with organic monoisocyanates; with
 (b) organic compounds containing at least two isocyanate-reactive groups in the context of the isocyanate addition reaction, optionally in the presence of organic compounds containing one isocyanate-reactive group in the context of the isocyanate addition reaction; compounds containing ionic groups and/or groups which may be converted into ionic groups being used as component (a) and/or (b), characterized in that the compounds containing ionic groups or groups convertible into ionic groups which are used in accordance with the present invention are both:
  (i) compounds containing anionic groups and/or groups convertible into anionic groups; and
  (ii) compounds containing cationic groups and/or groups convertible into cationic groups;
any groups convertible into ionic groups which are present in the polyaddition product on completion of its synthesis being at least partly converted into ionic groups in known manner by neutralization or quaternization, and finally the type and quantities of synthesis components used and, optionally, the degree of neutralization and quaternization being selected in such a way that an equivalent ratio between cationic and anionic groups of from about 5:1 to 1:10 prevails in the end product ultimately obtained for a total content of ionic groups of from about 2 to 300 milliequivalents per 100 g of solids and in that at least one urethane or urea group is present between every cationic and anionic group which is chemically fixed in the end product.

The present invention also relates to non-foamed polyisocyanate polyaddition products containing urethane and/or urea groups, characterized by a content of from about 2 to 300 milliequivalents per 100 g of ionic groups chemically bound into said polyisocyanate polyaddition adducts which are made up of cationic and anionic groups in an equivalent ratio of from about 5:1 to 1:10, the cationic groups being separated from the anionic groups by at least one urethane and/or urea group.

Furthermore, the present invention also relates to the use of the polyaddition products according to the present invention dissolved or dispersed in water and/or organic solvents or dispersants for coating flexible or non-flexible sheet-form materials.

DETAILED DESCRIPTION OF THE INVENTION

Any non-ionic polyisocyanates may be used in the process according to the present invention. It is preferred to use diisocyanates corresponding to the following general formula: $Q(NCO)_2$, wherein Q represents an aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms or an araliphatic hydrocarbon radical containing from 7 to 15 carbon atoms. Examples of these preferred diisocyanates include: tetramethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanatodicyclohexyl methane, 4,4'-diisocyanato-2,2-dicyclohexyl propane, 1,4-diisocyanatobenzene, 2,4-diisocyanatotoluene, 2,6-diisocyanatotoluene, 4,4'-diisocyanatodiphenyl methane, 4,4'-diisocyanato-2,2-diphenyl propane, p-xylylene diisocyanate or $\alpha,\alpha,\alpha',\alpha'$-tetramethyl-m- or -p-xylylene diisocyanate and mixtures of these compounds.

It is, of course, also possible proportionately to use the more highly functional polyisocyanates known in polyurethane chemistry or even known modified polyisocyanates, for example polyisocyanates containing carbodiimide groups, allophanate groups, isocyanurate groups, urethane groups and/or biuret groups, in the process according to the present invention.

Monoisocyanates, such as phenyl isocyanate, hexyl isocyanate of dodecyl isocyanate, may also be used in the process according to the present invention, although in this case premature chain-termination has to be prevented by the simultaneous use of synthesis components having a functionality of more than two.

Non-ionic compounds containing at least two isocyanate-reactive groups which may optionally be used in the process according to the present invention are in particular organic compounds containing a total of at least two amino groups, carboxyl groups and/or hydroxyl groups and having a molecular weight of from about 62 to 10,000, preferably about from 500 to 6000. It is preferred to use the corresponding dihydroxy compounds. The use of compounds having a functionality of three or more in the context of the isocyanate polyaddition reaction in small quantities for obtaining a certain degree of branching is also possible, as is the above-mentioned use of polyisocyanates having a functionality of three or more for the same purpose. Monohydric alcohols, such as n-butanol or n-dodecanol, may also be used in small quantities, but only under the conditions stipulated above in regard to the monoisocyanates.

Preferred hydroxyl compounds are the hydroxy polyesters, hydroxy polyethers, hydroxy polythioethers, hydroxy polyacetals, hydroxy polycarbonates and/or hydroxy polyester amides known in polyurethane chemistry.

The polyesters containing hydroxyl groups which may be used in accordance with the present invention are, for example, reaction products of polyhydric, preferably dihydric and, optionally, even trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted for example, by halogen atoms, and/or may be unsaturated. Examples of these polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhyride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bisglycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol, sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactam, or hydroxy carboxylic acids, such as ω-hydroxy caproic acid, may also be used.

The polyethers preferably containing two hydroxyl groups which may be used in accordance with the present invention are also known and are obtained, for example, by the polymerization of epoxides, such as ethylene oxide, propylene oxide, butylene oxide, tetrahydrofuran, styrene oxide or epichlorhydrin, on their own, for example in the presence of $BF_3$, or by the addition of these epoxides, optionally in admixture or successively, with preferably difunctional starting components containing reactive hydrogen atoms, such as alcohols or phenols, such as ethylene glycol, 1,3- or 1,2-propylene glycol, 4,4'-dihydroxy diphenyl propane or water.

Polyethers modified by vinyl polymers of the type formed, for example, by the polymerization of styrene and acrylonitrile in the presence of polyethers (U.S. Pat. Nos. 3,383,351; 3,304,273; 3,523,093; 3,110,695; German Pat. No. 1,152,536) are also suitable. The more highly functional polyethers which may optionally be proportionately used are analogously formed by the known alkoxylation of more highly functional starter molecules, for example ammonia, ethanolamine, ethylene diamine or sucrose.

Among the polythioethers, particular reference is made to the condensation products of thioglycol on its own and/or with other glycols, dicarboxylic acid, formaldehyde, aminocarboxylic acids or amino alcohols. Depending upon the co-components, the products in question are polythio mixed ethers, polythioether esters, polythioether ester amides.

Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Suitable polyacetals may also be produced by the polymerization or cyclic acetals.

Suitable polycarbonates containing hydroxyl groups are those known compounds which may be produced, for example, by reacting diols, such as 1,3-propane diol, 1,4-butane diol and/or 1,6- hexane diol, diethylene glycol, triethylene glycol and tetraethylene glycol, with diaryl carbonates, for example diphenyl carbonate, or with phosgene.

The polyester amides and polyamides include, for example, the predominantly linear condensates obtained from polybasic saturated and unsaturated carboxylic acids or the anhydrides thereof and polyhydric saturated and unsaturated amino alcohols, diamines, polyamines and mixtures thereof. Polyhydroxyl compounds already containing urethane or urea groups may also be used.

It is, of course, also possible to use simple glycols, such as ethylene, propylene or hexamethylene glycol.

Representatives of these compounds which may be used in accordance with the present invention are described, for example, in High Polymers, Vol. XVI, "Polyurethanes, Chemistry and Technology," by Saunders-Frisch, Interscience Publishers, New York, London, Vol. I, 1962, pages 32–42 and pages 44–54, and Vol. II, 1964, pages 5–6 and 198–199, and in Kunststoff-Handbuch, Vol. VII, Vieweg-Höchtlen, Carl-Hanser-Verlag, Munich, 1966, for example on pages 45–71.

In addition to these classical synthesis components of polyurethane chemistry which do not contain any (potential) ionic groups and which may optionally be used in accordance with the present invention, further synthesis components suitable for use in the process according to the present invention are compounds which contain at least one, preferably two, isocyanate groups or at least one, preferably two, isocyanate-reactive groups and, in addition, ionic groups or potential ionic groups which may be converted into ionic groups by a simple neutralization or quaternization reaction. Such compounds are, for example, isocyanates modified with (potential) ionic groups of the type described in DT-OS No. 1,939,911; DT-OS No. 2,227,111; DT-OS No. 2,359,613, DT-OS No. 2,359,614; or U.S. Pat. No. 3,959,348; for example aromatic polyisocyanates containing free sulphonic acid groups of the type obtainable by sulphonating aromatic polyisocyanates, such as, in particular, 2,4-diisocyanato toluene or 4,4'-diisocyanatodiphenyl methane. Diisocyanates which are reactive to amines as quaternizing agents, such as chlorohexyl isocyanate, m-chloromethyl phenyl isocyanate, 2,4-diisocyanatobenzyl chloride or isocyanates containing alkyl sulphonic acid ester groups, such as 4-isocyanato benzene sulphonic acid methyl ester, may also be used as compounds containing potential ionic groups in the process according to the present invention because cationic groups chemically built into said compounds are also introduced into the polyaddition product by the reaction thereof with tertiary amines, for example.

However, in the practical application of the process according to the present invention, the cationic and anionic groups are preferably introduced by the use of compounds containing (potential) cationic groups and isocyanate-reactive hydrogen atoms and compounds containing (potential) anionic groups and isocyanate-reactive hydrogen atoms. This class of compounds includes, for example, tertiary nitrogen-containing polyethers having preferably two terminal hydroxyl groups of the type obtainable in known manner, for example by alkoxylating amines containing two hydrogen atoms bound to amine nitrogen, such as N-methylamine, aniline or N,N'-dimethyl hydrazine. Such polyethers generally have a molecular weight of from about 500 to 6000. However, the ionic groups are preferably introduced by the use of comparatively low molecular weight compounds containing (potential) ionic groups and isocyanate-reactive groups. Examples of these compounds are given in U.S. Pat. No. 3,479,310; in DT-OS No. 2,437,218 and in DT-OS No. 2,426,401. Diamines containing thioether groups, such as 2-aminophenyl-(3-aminopropyl)-thioether, or dihydroxyphosphonates, such as the sodium salt of 2,2,3-dihydroxy propane phosphonic acid ethyl ester or the corresponding sodium salt of non-esterified phosphonic acid, may also be used as ionic synthesis components.

Particularly preferred (potential) ionic synthesis components include N-alkyl dialkanolamines, such as N-methyl diethanolamine, N-ethyl diethanolamine or N-propyl dipropanolamine, diaminosulphonates of the type described in Canadian Patent No. 928,323, such as the sodium salt of N-(2-aminoethyl)-2-aminoethane sulphonic acid, dimethylol propionic acid and sulphonate diols corresponding to the following general formula:

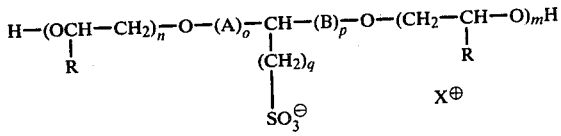

wherein
- A and B, which may be the same or different, each represents a difunctional aliphatic hydrocarbon radical containing from 1 to 6 carbon atoms;
- R represents hydrogen, an aliphatic hydrocarbon radical containing from 1 to 4 carbon atoms or a phenyl radical;
- $X^\oplus$ represents an alkali metal cation or an optionally substituted ammonium group;
- n and m each represents the same or different number of from 0 to 30;
- o and p each represents 0 or 1; and
- q represents an integer of from 0 to 2.

The potential ionic groups, if any, initially incorporated in the polyaddition product may be converted into ionic groups in a known manner by neutralizing the potential anionic and cationic groups or by quaternizing tertiary amine nitrogen atoms or tertiary phosphine phosphorus atoms which may be present in the polyaddition products according to the present invention when, instead of the tertiary amines exemplified above containing isocyanate-reactive hydrogen atoms, tertiary phosphines analogous to these tertiary amines have been incorporated, or by converting any thioether groups present into the corresponding sulphonium salts using quaternizing agents. Suitable neutralization and quaternization agents are described in U.S. Pat. No. 3,479,310, column 6.

Accordingly, the following ionic centers in particular are present in the polyaddition products according to the present invention:

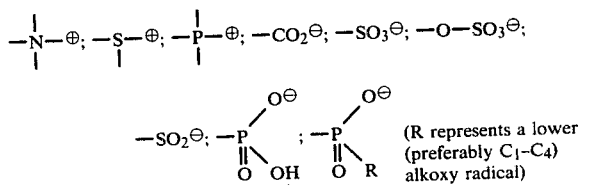

Of these ionic groups,

$-CO_2^\ominus$; $-SO_3^\ominus$ are preferred, the quaternary ammonium group preferably being incorporated in the main chain of the polyaddition product although lateral am-mounium groups chemically bound into said polyaddition products are also possible, of the type which may be formed, for example, by reacting labile halogen atoms incorporated in the chain, which in turn have been incorporated by using polyisocyanates or polyhydroxyl compounds containing labile halogen atoms, with tertiary amines, such as triethylamine, or by incorporating, for example, glycols containing lateral tertiary amine nitrogen atoms, such as 2-ethyl-2-dimethylaminomethyl-1,3-propane diol, and subsequently quaternizing the tertiary nitrogen incorporated. One particularly elegant method of incorporating both anionic and also cationic groups into the polyaddition products is, for example, to synthesize a polyaddition product which contains both free sulphonic acid or carboxylic acid groups and labile halogen atoms, preferably chlorine atoms, and which is reacted with a tertiary amine, for example triethylamine, on completion of the polyaddition reaction, whereby it is possible simultaneously to obtain conversion of the acid groups into the corresponding anionic salt group and conversion of the labile halogen atom into a quaternary ammonium group. Another possible method of introducing quaternary ammonium groups into the polyaddition products according to the present invention is simultaneously to use monohydric alcohols containing labile halogen atoms or sulphonic acid groups and monohydric alcohols containing tertiary amino groups in the synthesis of the polyaddition products in accordance with the principle of DT-AS No. 1,300,275, the thus-introduced quaternary ammonium groups, which are formed in situ, being present in the main chain of the polyaddition product.

The equivalent ratio of cations incorporated into the polyaddition products according to the present invention to anions incorporated in homopolar form amounts to from about 5:1 to 1:10, the total ion content generally amounting to from about 2 to 300 milliequivalents, preferably to from about 5 to 100 milliequivalents, per 100 g of solids.

The ionic groups are preferably incorporated in the polyaddition products according to the present invention by methods (1) to (3) described below, several of which may also be successively used during the synthesis of the polyaddition product:

(1) the (potential) ionic groups are incorporated in the prepolymer by means of suitable (potentially) ionically modified diols;

(2) the (potential) ionic groups are incorporated in the polyaddition product by means of suitable modified amines containing two primary and/or secondary amino groups;

(3) the (potential) anionic or cationic groups are incorporated by the subsequent modification of a polyaddition product containing (potential) cationic or (potential) anionic groups by means of a modifying agent containing free NCO-groups and (potential) anionic or (potential) cationic groups, provision having to be made to ensure that the polyaddition product to be modified contains groups reactive to NCO-groups. It is possible in this way to synthesize polyaddition products in which relatively long, exclusively anionically modified segments are attached to relatively long, exclusively cationically modified segments.

The polyaddition products according to the present invention always contain both cations and anions chemically built into the polyaddition products and are not present in them either in the form of betaines, or in the form of an inter-molecularly ionically cross-linked system, which means that corresponding oppositely charged ions which are not chemically built in are present for both types of ions built into the polyaddition product.

Production of the polyaddition products in accordance with the present invention may be carried out by continuous and batch processes which are determined by the nature of the end product and, in particular, by whether the ampholyte in question is a solid, a solution or a dispersion in water or a mixture of water and an organic solvent or in an organic medium. In general, a prepolymer which already has amphoteric or cationic or anionic character is produced as intermediate products by the known processes of polyurethane chemistry.

In practice, the polyaddition products according to the present invention are of particular interest as aqueous solutions or dispersions, solutions or dispersions in mixtures of water and water-miscible organic solvents or as solutions or dispersions in organic polyhydroxyl compounds. Accordingly, it is particularly advisable for the production of the polyaddition products in accordance with the present invention to be accompanied by the dissolution or dispersion thereof in the above-mentioned media.

Aqueous dispersions of the polyaddition products according to the present invention are particularly preferred for practical purposes because these dispersions combine the known advantages of anionic and cationic aqueous polyurethane dispersions.

In the polyaddition products according to the present invention which are dissolved or dispersed in water or which are to be dissolved or dispersed in water, the equivalent ratio between anions and cations is from about 10:1 to 1:1, preferably from about 5:1 to 1:1, while the total ion content amounts to from about 2 to 300, preferably from about 5 to 100, milliequivalents per 100 g of solids. In the production of aqueous solutions or dispersions of the polyaddition products according to the present invention, the anions are incorporated into the polyaddition product as such or in the form of potential anionic groups before dispersion, although they should be present in salt form before dissolution or dispersion. The cationic groups are preferably initially incorporated into the polyaddition product in the form of potential cationic groups and particularly in the form of tertiary nitrogen atoms, and may be converted into the ionic form before, during or even after dissolution or dispersion.

Basically, however, it would also be possible, although not preferred, to synthesize, for example, any NCO—prepolymer containing tertiary amino groups and to extend it in aqueous phase using an anionic diamine of the type exemplified above in order subsequently to convert the tertiary amino groups present into the corresponding ammonium groups by neutralization or quaternization. In general, this embodiment may only be carried out by using particularly high speed stirrers during neutralization or quaternization.

Accordingly, one of the following two embodiments is generally adopted for producing solutions or dispersions of the polyaddition products according to the present invention in water:

(1) A polyaddition product containing anionic centers and potential cationic centers is produced, dispersed in water and the potential cationic groups present are subsequently converted into cationic groups by neutralization using an acid. In this connection, it is also possible to incorporate at least some of the anionic groups during dispersion by reacting an NCO-prepolymer containing potential cationic groups and, optionally, anionic groups with an aqueous solution of a chain-extender containing anionic groups (for example diaminoalkane sulphonates of the type exemplified above). In this embodiment (1), the equivalent ratio between anionic groups and cationic groups must always be selected in such a way that an excess of anionic groups is present, even in the event of complete neutralization of the potential cationic groups. The equivalent ratio of anions to cations is thus from about 10:1 to 1.5:1, preferably from about 5:1 to 1.5:1.

(2) The ionic groups are introduced as such into the polyaddition product to be dissolved or dispersed or into an NCO-prepolymer leading to the polyaddition product before the actual solution or dispersion process. In the first case, the polyaddition product is subsequently dissolved or dispersed, whereas in the second case, the dissolution or dispersion of the NCO-prepolymer is accompanied by its chain-extension to form the polyaddition product according to the present invention, which is possible, for example, by using aqueous solutions of optionally ionically-modified diamine chain extenders, such as diethylamine, hydrazine or diaminoalkane sulphonates of the type exemplified above. In this embodiment (2), it is also possible to reduce the total equivalent ratio between anions and cations to about 1:1. Using an equivalent ratio of from about 1.5:1 to 1:1, both types of ion must always be present as such, i.e. as mentioned above neither in betaine form, nor as an inter-molecularly ionically cross-linked system. In addition to the above-mentioned ionic hydrophilic centers, non-ionic hydrophilic groups may also be incorporated into the polyaddition products according to the present invention, for which purpose it is possible to use, for example, the starting materials and processes according to DT-OS No. 2,314,512; DT-OS No. 2,314,413, and allowed U.S. patent application No. 741,818, filed Nov. 15, 1976, U.S. patent application No. 821,268, filed Aug. 3, 1977, and U.S. patent application No. 849,690, filed Nov. 8, 1977 which correspond to German patent applications P 25 51 094.5; P 26 37 690.9 and P 26 51 506.0, respectively. However, in the end products according to the present invention, the ionic groups always make the largest contribution to the hydrophilicity of the system as a whole. The question of whether the above-mentioned aqueous systems are solutions or dispersions is primarily dependent upon the concentration of the above-mentioned hydrophilic centers and may readily be adapted to meet particular requirements by correspondingly varying the quantitative ratios between the starting materials.

For preparing aqueous solutions or dispersions of the end products of the process according to the present invention, use may be made of conventional processes except that, instead of the anionic or cationic centers which are incorporated in these conventional processes, it is possible to introduce both anionic and also cationic centers into the polyaddition product. This means in particular that the solutions or dispersions may be produced by the solvent process as described, for example, in U.S. Pat. No. 3,479,310 or British Pat. No. 1,076,688, or by the so-called "melt dispersion process" according to U.S. Pat. No. 3,756,992 or finally by the process described in German patent application P 25 43 091.5 which corresponds to U.S. application No. 727,088, filed Sept. 27, 1976. The above-mentioned conventional processes for producing solutions or dispersions of ionic polyurethanes may also be used for producing solutions or dispersions of the polyaddition products essential to the present invention in water, taking into account the criteria essential to the present invention.

The conventional auxiliaries and additives, such as described, for example, in U.S. Pat. No. 3,479,310, column 8, line 40 and column 9, line 10, incorporated herein by reference, may be added to the aqueous dispersions or solutions of the polyaddition products according to the present invention.

The aqueous solutions or dispersions of the polyaddition products according to the present invention are particularly suitable for coating any flexible or non-flexible substrates, such as textiles, leather, wood, metals, plastics, glass and other materials. They are generally applied by knife coating, extrusion coating or electrophoretically. Another interesting application for the aqueous solutions or dispersions is the coating of pigments or even glass in the form of aqueous sizes. The aqueous dispersions may also be used as adhesives.

As mentioned above, the solutions or dispersions of the polyaddition products according to the present invention in mixtures of water and water-miscible organic solvents are of considerable practical significance. Such solutions or dispersions are particularly suitable for use as cogulation auxiliaries, for example in the coagulation process according to DT-OS No. 1,270,276; DT-OS No. 1,694,171; DT-OS No. 2,345,256 or DT-OS No. 2,427,244.

These solutions or dispersions, which may optionally exist in gel form, contain as continuous phase a mixture of water with water-miscible solvents in a ratio, by volume, of water to solvent of from about 1:99 to 90:10, preferably from about 1:99 to 25:75 and, with particular preference, from about 4:96 to 8:92. Preferred solvents are dimethyl formamide, tetrahydrofuran, acetone, methylethyl ketone or tetramethyl urea. Dimethyl formamide is particularly preferred.

In cases where the polyaddition products according to the present invention are intended to be used as solutions or dispersions in the above-mentioned mixtures, it is advisable during the synthesis thereof to ensure either an excess of anions or an excess of cations within the above-mentioned range of from about 10:1 to 1:5 because, with an equivalent ratio of about 1:1, systems of very high viscosity are generally obtained. In addition, the embodiments of the process are only of secondary importance in the production of polyaddition products according to the present invention which are intended to be dissolved or dispersed in mixtures of water and the above-mentioned solvents. The polyaddition products are synthesized from the starting materials exemplified above, the potential ionic groups optionally present being converted into ionic groups both in the water-solvent mixture or even before introduction of the polyaddition products into this mixture. Moreover, the polyaddition products may be produced either as such or even in solution, preferably in one of the solvents exemplified above. In one particularly simple embodiment, for example, an NCO-prepolymer containing tertiary amine nitrogen is prepared in dimethyl formamide, the corresponding prepolymer containing cationic groups is obtained therefrom by quaternization and is then chain-extended using an aqueous solution of an anionically-modified diamine. A solution or dispersion of a polyaddition product according to the present invention in a mixture of water and dimethyl formamide is directly formed in this way. The question of whether solutions or dispersions or gels of the polyaddition products according to the present invention are ultimately obtained is dependent upon the hydrophilic group content and also upon the proportion of solvent in the water-solvent mixture.

Another important application for the polyaddition products according to the present invention is the conversion thereof into a solution or dispersion in organic polyhydroxyl compounds of the type known for the production of polyurethanes and exemplified above as non-ionic synthesis components for the polyaddition products according to the present invention.

These solutions or dispersions of the polyaddition products according to the present invention in organic polyhydroxyl compounds are particularly valuable starting materials for the production of polyurethane plastics because they impart the advantageous properties inherent therein to the polyurethane plastics. Thus, polyurethane foams produced, for example, from such solutions or dispersions are generally much more hydrophilic than the polyurethane foams produced from the corresponding polyhydroxyl compounds without the polyaddition products according to the present invention. In addition, solutions or dispersions of the polyaddition products according to the present invention containing isocyanate-reactive hydrogen atoms are also valuable starting materials for the production of one-component and two-component adhesives or lacquers based on polyurethanes. The end products according to the present invention may also be used in the form of aqueous dispersions for the production of ionically-modified polyurethane foams by using the aqueous dispersions as chemical blowing agent instead of the water often used in the production of polyurethane foams.

Solutions or dispersions of the polyaddition products according to the present invention in polyhydroxyl compounds may be produced by essentially two methods:

(1) An aqueous dispersion or solution of a polyaddition product according to the present invention prepared as described above is mixed with a polyhydroxyl compound boiling above 100° C. and the water subsequently or simultaneously removed by distillation in accordance with the teaching of U.S. patent application No. 763,219, filed Jan. 27, 1977, which corresponds to German patent application P 25 50 860.5. This embodiment is, of course, subject to the above-mentioned limitations concerning the equivalent ratio of anions to cations in the aqueous dispersions.

(2) The polyaddition products according to the present invention may also be synthesized in the organic polyhydroxyl compound as reaction medium, providing provision is made to ensure that the hydroxyl groups of the reaction medium have no opportunity to react with the polyisocyanate component used in the synthesis of the polyaddition products according to the present invention. Such provision may be made, for example, by initially preparing an NCO-prepolymer in the absence of the reaction medium from a polyisocyanate component and another synthesis component, for example N-methyl diethanolamine, optionally using other non-ionic compounds containing isocyanate-reactive hydrogen atoms of the type exemplified above, and subsequently chain-extending the thus-formed NCO-prepolymer using a mixture of an organic polyhydroxyl compound and at least one diamine chain-extender. This ensures that the NCO-groups of the prepolymer react selectively with the much more reactive amino groups of the chain-extender and not with the hydroxyl groups of the reaction medium. If an anionically-modified diamine is used as chain-extender where this principle is applied and if the tertiary amine nitrogen atoms are quaternized, for example using dimethyl sulphate, after chain-extension, a solution or dispersion of a polyaddition product according to the present invention in an organic polyhydroxyl compound is immediately obtained. In this process, water may also be used as auxiliary solvent, being distilled off on completion of the reaction.

This particular embodiment is only one of several possibilities of producing polyaddition products according to the present invention in solution or dispersion in polyhydroxyl compounds. Basically, conventional processes may also be used for this purpose, providing the essential features of the present invention are taken into consideration. This means that it is possible to work, for example, in analogy to the processes described in U.S. patent application No. 740,450, filed Nov. 10, 1976 and U.S. patent application No. 827,292, filed Aug. 24, 1977, which correspond to German patent applications P 25 50 797.5 and P 26 38 759.7, respectively or the process according to DT-OS No. 2,513,815, obviously using ionic synthesis components of the type exemplified above, so that polyaddition products according to the present invention containing both anionic and also cationic groups are obtained. In all the processes mentioned in Method (2) above, the equivalent ratio of anion to cation is not critical and may lie within the wide limits mentioned above.

In addition, the catalysts commonly encountered in polyurethane chemistry may be used in all embodiments of the process according to the present invention. The equivalent ratio between isocyanate groups and isocyanate-reactive groups of all the synthesis components involved in the synthesis of the polyaddition products according to the present invention generally amounts to from about 0.8:1 to 1.2:1 and preferably from about 0.95:1 to 1.05:1.

In special cases where terminal H-acid end groups are to be incorporated the polyfunctional preferably difunctional compounds having terminal H-acid groups can also be used as if they were monofunctional. Thus if terminal urea groups are to be incorporated which can be chain-lengthened with formaldehyde urea is considered as a monofunctional compound in the sense of the isocyanate polyaddition reaction as far as its quantity in the reaction mixture in relation to the quantity of isocyanate groups is concerned.

EXAMPLES

EXAMPLE 1

Mixture:

368.0 g of adipic acid-phthalic acid-ethylene glycol polyester (OH-number 66.8) (PE)

30.5 g of the propoxylated adduct of 2-butene-1,4-diol and NaHSO$_3$ (molecular weight 305) (AD)

2.7 g of trimethylol propane (TMP)

88.1 g of 1,6-hexamethylene diisocyanate (H)

3.0 g of N-methyl diethanolamine (MDA)

20.2 g of urea 3.15 g of dimethyl sulphate (DMS)

1000 g of deionized water 65 g of formaldehyde (30% in water).

Method:

The polyester (PE) is dehydrated in vacuo for 30 minutes at 120° C. and then cooled to 90° C. The adduct (AD) and TMP are then added, followed by stirring for 5 minutes. The diisocyanate (H) is then added at 80° C., followed after another 5 minutes by addition of the (MDA). The reaction is exothermic. The temperature rises to 95° C. After stirring for about 20 minutes at 100° C., the mixture is then quickly heated to 130° C. and the urea added. After 60 minutes, the NCO-value had fallen to 0%. The mixture is then heated to 100° C. and the DMS stirred in over a period of 10 minutes. Water heated to 80° C. is then added with vigorous stirring. The formaldehyde solution is then added dropwise, after which the reaction mixture is stirred for about 1 hour, during which the temperature slowly falls to room temperature. A stable finely divided dispersion having a solids content of 32% and a Ford cup viscosity (4 mm orifice) of 41 seconds is obtained. The anion: cation equivalent ratio amounts to $\approx 4:1$. The solids contain 4.7 milliequivalents of cation/100 g of solids and 18.7 milliequivalents of anion/100 g of solids. The dispersion is suitable as a primer for leather and, in this respect, is distinguished from comparable anionic dispersions by improved flexural strength and improved wet adhesion. The degree of swelling of the films in water falls to from about 10 to 20% by comparison with films of comparable anionic dispersions.

EXAMPLE 2

Mixture:

270 g of adipic acid-ethylene glycol polyester (MW 2030) (PE)

60 g of phthalic acid-adipic acid-ethylene glycol polyester (MW 1711) (PAA)

56.4 g of 4,4'-diphenyl methane diisocyanate (44)

1.43 g of N-methyl diethanolamine (MDA)

1200 ml of acetone 1.51 g of dimethyl sulphate (DMS)

17.5 g of sodium ethylene diamino-2-ethane sulphonate (45% in water) (AAS)

600 ml of water.

Method:

(PE) and (PAA) are dried in a water jet vacuum for 30 minutes at 120° C. and cooled to 65° C. (44) is added with intensive mixing. After 5 minutes, (MDA) is added. The mixture reacts until an NCO-value of 0.97% is observed (approximately 40 minutes). Acetone is quickly stirred in. The low viscosity acetone solution is then reacted with DMS for 10 minutes at 50° C. The acetonic cationic prepolymer is then chain-extended using (AAS). After a reaction time of 5 minutes, 600 ml of water are added. The acetone is immediately distilled off. A shimmering blue, non-sedimenting dispersion having a solids content of about 45% and an anion-cation ratio of 3.5:1 (7:2) is formed. The solids contain 3 milliequivalents of cation and 10.4 milliequivalents of anion/100 g of solids. The dispersion has a Ford cup viscosity (4 mm orifice) of 12 seconds. Its pH value amounts to 7.6. The dispersion is suitable for dip coagulation attributable in particular to the low degree of swelling of the film in water (degree of swelling: 13%, by volume). It amounts to only about one third of that of comparable anionic dispersions.

EXAMPLE 3

Mixture:
70.0 g of phthalic acid-adipic acid-ethylene glycol polyester (MW 1700) (PAA)
240.3 g of phthalic acid-ethylene glycol polyester (MW 2000) (PAP)
36.8 g of the propoxylated adduct of 2-butene-1,4-diol and NaHSO$_3$ (OH-number 263, iodine number 7.0; 80% in toluene) (AD)
58.2 g of hexamethylene diisocyanate (1.6) (H)
8.1 g of N-methyl diethanolamine (N-MDA)
11.4 g of isophorone diamine (IPDA)
0.7 g of hydrazine hydrate
4.0 g of chloracetamide
4.0 g of 85% phosphoric acid
285.0 g of acetone
1065.0 g of water
20.0 g of formaldehyde (30% in water).

Method:
The polyols (PAA), (PAP) and (AD) are dehydrated in vacuo with stirring for 45 minutes at 110° C. and then cooled to 80° C. The diisocyanate (H) is then added and the mixture is stirred at 80° C. until an NCO-value of from 2.4 to 2.5% is observed (approximately 2 hours). 145 g of acetone are then added at 50° C., followed after stirring for 5 minutes by addition of the diol (N-MDA). After stirring for 1.5 hours at 60° C., 140 g of acetone are added and then a mixture of (IPDA), hydrazine hydrate and 15 g of water is stirred in. After another 30 minutes, chloracetamide and phosphoric acid are added, followed by intensive stirring for 30 minutes at 50° C. 1050 g of water and, 5 minutes later, the formaldehyde are then added with vigorous stirring. Finally, the acetone is distilled off.

A shimmering blue, non-sedimenting dispersion having a solids content of 27.9% and a Ford cup viscosity (4 mm orifice) of 12.3 seconds is formed. It has a pH-value of 6.2. The dispersion contains 15.65 milliequivalents of SO$_3^\ominus$ groups and 15.65 milliquivalents of quaternary nitrogen per 100 g of solids. It has a particle size of from 210 to 440 m$\mu$. 50 ml of a 10% dispersion may be stirred with 35 ml of 10% NaCl-solution without coagulating. The dispersion may be dried to form hard films adhering firmly to glass.

EXAMPLE 4

Mixture:
570.0 g of polypropylene oxide ether started with bisphenol A (MW 570) (PE)
142.4 g of the propoxylated adduct of 2-butene-1,4-diol and NaHSO$_3$ (MW 435,80% in toluene) (AD)
7.74 g of N-methyl diethanolamine (N-MDA)
334.0 g of 1,6-hexamethylene diisocyanate (H) 84.0 g of urea.

Method:
The polyether (PE) and the adduct (AD) are dehydrated in vacuo with stirring for 1 hour at 110° C. and then cooled to 80° C. The (N-MDA) is added, followed 5 minutes later by addition of the diisocyanate (H), still a temperature of 80° C. The temperature is then increased to 100° C. and the reaction mixture stirred until the NCO-value of 4.85% is reached (35 minutes). The mixture is then heated to 120° C. during which the urea is added. Under the effect of the exothermic reaction, the temperature rises to 135° C. The mixture is stirred at 135° C. until no more free NCO-groups may be detected in the melt. The hot melt is poured onto a Teflon-coated paper.

After the solid has been cooled to room temperature, it may be mechanically size-reduced. The solid softens at about 105° C. becoming a melt at about 130° C. The average calculated molecular weight amounts to 1585. 100 g of solid contains 20.7 milliequivalents of SO$_3^\ominus$ groups and 5.9 milliequivalents of tertiary nitrogen units which may be converted into cationic groups by salt formation.

The solid disperses spontaneously when it is introduced into cold water with gentle stirring (magnetic stirrer). An aqueous dispersion, to which formaldehyde was added in a ratio of formaldehyde to terminal biuret group of 1.33, has a Ford cup outflow time (4 mm orifice) of 14.4 seconds for a solids content of 31%. The dispersion is adjusted to pH 7 using 10% H$_3$PO$_4$. The neutralized dispersion containing ampholytic polyurethane solid shows a Tyndall effect in transmitted light. The films drawn from this dispersion are clear and hard and are suitable as a finish for dressing leather.

EXAMPLE 5

Pre-adduct for Example 6
Mixture:
175 g of tolylene diisocyanate (2,4-/2,6-isomers 80:2) (T80)
11.9 g of N-methyl diethanolamine (N-MDA).

Method:
The (T 80) is cooled to 15° C. in a receiver. (N-MDA) (at 15° C.) is then added dropwise over a period of 5 minutes with slow stirring. The mixture undergoes an increase in temperature to 25° C. After 5 minutes, an NCO-value of 39.2% is observed, falling after another 40 minutes to 38.6%
After 1 day, the NCO-value amounts to 36.1%. The product is in the form of a clear yellow oil of low viscosity.

EXAMPLE 6

Polyether dispersion
Mixture:
932.0 g of a trimethylol-propane-started polypropylene oxide polyethylene oxide ether (PO:AO=83:17) (OH-number 34) (PE)
40.8 g of sodium ethylene diamino-2-ethane sulphonate (46.5% in water) (AAS)
40.4 g of hydrazine hydrate (99% in water) (Hyd)
97.4 g of deionized water
185.9 g of the oil of Example 5.

Method:
A mixture of the polyether (PE), the two amines (AAS) and (Hyd) and water is introduced at 70° C. into a sulphonation beaker. The pre-adduct of Example 5 is then added over a period of 10 minutes, the temperature rising to 110° C. The water is then distilled off in vacuo at 60° C., leaving a dispersion having a viscosity $\eta_{25°\,C.}$ of 2034 cP which rises after 1 day to $\eta_{25°\,C.}$ of 2473 cP. No sedimentation is observed in a centrifuge test (15 minutes, 3000 rpm).

EXAMPLE 7

Quaternization of the product of Example 6
Mixture:
581.3 g of the end product of Example 6 6.2 g of dimethyl sulphate (DMS)
Method:

The dispersion of Example 6 is heated to 50° C., after which the DMS is added. The mixture is stirred for 30 minutes at 50° C. A dispersion is obtained which has an initial viscosity $\eta_{25°\ C.}$ of 2221 cP which after 1 day stabilizes at $\eta_{25°\ C.}$ 2424 cP. The particle size of the solid particles amounts to from 1 to $2\mu$. The equivalent ratio of cation to anion amounts to 1:1, i.e. there are 38.7 milliequivalents of each for 100 g of solids.

EXAMPLE 8

Monoethylene glycol
Mixture:
  932.0 g of monoethylene glycol (ME)
  14.5 g of methyl-bis-(3-aminopropyl)-amine (M-BAA)
  40.8 g of sodium ethylene diamino-2-ethane sulphonate (46.5% in water) (AAS)
  40.5 g of hydrazine hydrate (99% in water) (Hyd)
  174.0 g of tolylene diisocyanate (2,4/2,6-isomer 80:20) (T 80)
  11.4 g of dimethyl sulphate (DMS).
Method:
(T 80) is added dropwise over a period of 10 minutes at room temperature to a mixture of (ME), (M-BAA), (AAS) and (Hyd), the temperature rising to 39° C. A coarsely divided suspension is obtained. The small quantity of water is then distilled off in vacuo, leaving a clear solution which is mixed with (DMS) at 65° C., followed by stirring for about 30 minutes. The clear solution formed has a viscosity $\eta_{25°\ C.}$ of 140 cP. It contains 38 milliequivalents of cation and 42 milliequivalents of anion per 100 g of solids.

EXAMPLE 9

Dispersion in water/dimethyl formamide
Preliminary stage:
  32.00 kg of phthalic acid-adipic acid-ethylene glycol polyester (OH-number 64) (PAA)
  10.58 kg of 1,6-hexamethylene diisocyanate (H)
  0.945 kg of N-methyl diethanolamine (N-MDA)
  44.48 kg of dimethyl formamide (DMF)
  0.995 kg of dimethyl sulphate (DMS).
Method:
The polyester (PAA) was dehydrated in vacuo for 30 minutes at 130° C. 7.6 kg of diisocyanate (H) were added at 100° C. After a reaction time of 1 hour at from 100° to 130° C., the mixture was cooled to 63° C. and an NCO-value of 5.69% was observed.
N-MDA was then added, followed by stirring for 1 hour at about 65° C. The mixture was then diluted with 23 kg of DMF. After 10 minutes of stirring DMS in 1,5 kg of DMF was added and stirring continued for 30 minutes at 65° C. Another 17 kg of DMF were then stirred in. An NCO-value of 1.97% is observed. 2.98 kg of diisocyanate (H) in 2.98 kg of DMF are stirred into this prepolymer. An NCO-value of 4.0% is observed.
Extension of the preliminary stage with amines in a double flow mixer:
Mixture:
  500 g/min. of the preliminary stage in DMF
  X g/min. of diethylene triamine in water (9.2%) (DAT)
  Y g/min. of sodium ethylene diamine-2-ethane sulphonate (46.5% in water) (AAS)
  220 g/min. of a DMF/water mixture (93:7).
The ampholyte dispersion is prepared as follows in a double flow mixer (mixer 1: 5000 ml volume; mixer 2: 250 ml volume, each equipped with a toothed stirrer): in mixer 1 the prepolymer of the preliminary stage is mixed with the DMF/water mixture and the (DAT) in water at about 3000 rpm. The dispersion formed is extended using (AAS) in mixer 2. Both mixers are jacket-cooled with brine (approximately −10° C.) to dissipate the heat of reaction. The final dispersion has a pH value of 7. The Ford cup viscosity amounts to 10 seconds for a solids content of 29.8% (orifice number 6). The following cation:anion ratios were adjusted in different settings:

| | Cation:anion of X g of DAT- approximate ratio | + Yg of AAS- | 6 mm orifice Ford cup |
|---|---|---|---|
| (a) | ~4:1 | 139 g DAT- | + 4.7 g AAS- | 10 secs. |
| (b) | ~2:1 | 131 g DAT- | + 9.4 g AAS- | 11 secs. |
| (c) | ~1:1 | 114 g DAT- | + 18.8 g AAS- | 15 secs. |

(a) contains 16.7 milliequivalents of cation and 4.3 milliequivalents of anion
(b) contains 16.7 milliequivalents of cation and 8.6 milliequivalents of anion
(c) contains 16.5 milliequivalents of cation and 17 milliequivalents of anion.

EXAMPLE 10

Production of film using the ampholyte dispersion of Example 9
A polyurethane of:
  24.3 g of adipic acid-butane diol polyester (OH-number 50)
  24.1 g of hexane diol polycarbonate (OH-number 56)
  6.5 g of 1,4-butane diol
  24.7 g of 4,4'-diphenyl methane diisocyanate
  0.4 g of hexamethylene diamine
in 240 g of dimethyl formamide is mixed with 65.5 g of the dispersion of Example 9a, 72 g of dimethyl formamide and 4.5 g of dye and degassed. Approximately 100 g of this mixture are poured onto a glass plate and smoothly distributed using a knife. The coated plate is placed for 10 minutes in a gelation box in a stream of moist air. The plate is then placed for 15 minutes in a water bath. The film formed is then separated from the plate and rinsed for 10 minutes. The film is squeezed out between two rollers and subsequently dried for from 20 to 30 minutes at 100° C. After this single washing operation, the film is free from DMF. Where the conventional cation-anion systems are used, this washing process has to be repeated several times. The film does not show any efflorescence (separation of the dispersion) in a water bath and does not leave any soiling traces behind on the glass plate. The shrinkage which the film undergoes on heating is relatively low (20.5% per unit area).

EXAMPLE 11

Ampholyte in castor oil
A prepolymer is initially prepared as follows:
  174 g of tolylene diisocyanate (2,4-/2,6-isomer 80:20) are mixed in an ice bath at 15° C. with 11.9 g of N-methyl diethanolamine, the temperature rising to 25° C. A low viscosity, clear yellowish solution having an NCO-value of 39.2% is obtained, the NCO-value falling to 36.1% after 1 day.

Preparation of dispersion 97.4 g of deionized water are introduced at room temperature into a mixture of 932 g of castor oil, 40.8 g of sodium ethylene diamino-2-ethane sulphonate (46.5% in water) and 40.4 g of hydrazine hydrate. The mixture is heated to 70° C. after which the pre-adduct described above is added dropwise with intensive stirring over a period of 15 minutes, during which the temperature rises to 98° C. After another 15 minutes, the water is distilled off in a weak vacuum at about 80° C. After the water has been removed 12.4 g of dimethyl sulphate are stirred in. An ampholyte dispersion in castor oil having a particle size of the polyhydrazodicarbonamide particles of from 1 to 2μ is obtained. It has a viscosity of 3163 cP at 25° C. The solid contains 40 milliequivalents of anion and 40 milliequivalents of cation per 100 g.

EXAMPLE 12

Starting materials:
70.0 g of phthalic acid-adipic acid-ethylene glycol polyester (OH-number 64.1) (PAA)
240.3 g of phthalic acid-ethylene glycol polyester (OH-number 56.1) (PE)
30.9 g of propoxylated 1,4-dihydroxy butene-2-sulphonic acid (OH-number 267.5, iodine number 3.0) (AD)
59.68 g of 1,6-hexamethylene diisocyanate (H)
8.33 g of N-methyl diethanolamine (N-MDA)
3.72 g of isophorone diamine (IPDA)
1.10 g of hydrazine hydrate (Hy)
2.00 g of desalted water
2 drops of tin(II)octoate
500 g of acetone.

The polyesters (PAA) and (PE) and the acid (AD) are dehydrated with stirring for 10 minutes at 110° C., cooled to 80° C. and reacted with the diisocyanate (H). The temperature rises exothermically to 95° C. After 15 minutes, an NCO-value of 2.4% is observed. 140 g of acetone are stirred in with cooling. At 50° C. the (N-MDA) is added and the mixture stirred until an NCO-value of 0.9% is observed (75 minutes). Another 140 g of acetone are added, after which the mixture is stirred with a mixture of (IPDA), (Hy) and water until no more isocyanate is observed. The acetone solution is diluted with another 220 g of acetone. The solids component of the solution contains 16.9 milliequivalents of anion and 16.9 milliequivalents of cation per 100 g in the form of an ionic cross-link.

50 g of the prepolymer solution were adjusted to pH 14 using concentrated NaOH so that anionic and potential cationic (tertiary amino groups) groups are present, followed by back-titration to pH 7 using concentrated H$_3$PO$_4$. The solution was then dispersed in 6 ml of water at room temperature (magnetic stirrer). Immediately after stirring into the water, the acetone was removed by distillation, leaving a finely divided dispersion in water.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of solutions or dispersions of non-foamed urethane and/or urea group-containing polyisocyanate polyaddition products in which chemically fixed anionic groups and chemically fixed cationic groups are simultaneously present in a medium selected from the group consisting of water, organic solvents and dispersants which comprises reacting:
    (a) isocyanates selected from the group consisting of organic polyisocyanates and organic monoisocyanates; with
    (b) organic compounds selected from the group consisting of organic compounds containing at least two isocyanate-reactive groups and organic compounds containing one isocyanate-reactive group, compounds containing ionic groups and/or groups which may be converted into ionic groups being used as component (a) and/or component (b), characterized in that the compounds containing ionic groups or groups convertible into ionic groups which are used in accordance with the present invention are both:
        (i) compounds containing anionic groups and/or groups convertible into anionic groups; and
        (ii) compounds containing cationic groups and/or groups convertible into cationic groups; any groups convertible into ionic groups which are present in the polyaddition product on completion of its synthesis being at least partly converted into ionic groups, in known manner by neutralization or quaternization, and the synthesis components used and the degree of neutralization and quaternization being selected in such a way that an equivalent ratio between cationic and anionic groups of from about 5:1 to 1:10 prevails in the end product ultimately obtained for a total content of ionic groups of from about 2 to 300 milliequivalents per 100 g of solids and in that at least one urethane or urea group is present between every cationic and anionic group which is chemically fixed in the end product, and
    (c) dissolving or dispersing the polyisocyanate polyaddition products during or after their production in said medium.

2. Solutions or dispersions of non-foamed polyisocyanate polyaddition products containing urethane and/or urea groups in a medium selected from the group consisting of water, organic solvents and dispersants, characterized by a content of from about 2 to 300 milliequivalents of ionic groups per 100 g of solids chemically bound into the polyisocyanate polyaddition products which are made up of cationic and anionic groups in an equivalent ratio of from about 5:1 to 1:10, the cationic groups being separated from the anionic groups by at least one urethane and/or urea group.

3. Flexible or non-flexiblle sheet-form materials coated with the polyisocyanate polyaddition products of claim 2 dissolved or dispersed in mediums selected from the group consisting of water, organic solvents and dispersants.

4. A process for the production of a solution or dispersion of a non-foamed urethane group- and/or urea grop-containing polyisocyanate polyaddition product in which chemically bound anionic and cationic groups are simultaneously present comprising reacting
    (a) organic polyisocyanates with
    (b) organic compounds containing at least two isocyanate-reactive groups, wherein at least some of at least one of components (a) or (b) contain dispersing centers selected from the group consisting of anionic groups, potential anionic groups, cationic groups and potential cationic groups, and
    (c) dissolving or dispersing said polyisocyanate polyaddition product during or after its production in a medium selected from the group consisting of water, organic solvents and dispersants, said process resulting in a polyisocyanate polyaddition product
   (i) containing cationic and anionic groups in an equivalent ratio of from about 5:1 to 1:10,
   (ii) having a total content of ionic groups of from about 2 to 300 milliequivalents per 100 g of solids, and
   (iii) having at least one urethane or urea group between each cationic and anionic group which is chemically bound into the polyisocyanate polyaddition product.

5. The process of claim 4 wherein any potential anionic or cationic groups contained in the polyisocyanate polyaddition product after its synthesis are at least partly converted into ionic groups by neutralization or quaternization processes.

6. The process of claim 4 wherein the cationic groups contained in the polyisocyanate polyaddition product are in the form of potential cationic groups during the synthesis of the polyaddition product and then subsequently converted to cationic groups by quaternization processes.

7. The process of claim 4 wherein component (a) contains organic polyisocyanates of the formula

Q(NCO)$_2$ wherein
Q represents an aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms, or an araliphatic hydrocarbon radical containing from 7 to 15 carbon atoms.

8. The process of claim 4 wherein component (b) contains organic compounds containing at least two isocyanate-reactive groups having a molecular weight of from about 62 to 10,000 and selected from the group consisting of hydroxy polyesters, hydroxy polyethers, hydroxy polythioethers, hydroxy polyacetals, hydroxy polycarbonates and hydroxy polyester amides.

9. The process of claim 4 wherein compounds selected from the group consisting of organic monoisocyanates and organic compounds containing one isocyanate-reactive group are present.

10. The process of claim 4 wherein the resulting polyisocyanate polyaddition product has a total ionic content of from about 5 to 100 milliequivalents per 100 g of solids.

11. The process of claim 4 wherein the ratio of isocyanate groups to isocyanate-reactive groups is from about 0.8:1 to 1.2:1.

12. The polyisocyanate polyaddition products of claim 2 wherein the ionic groups are selected from the group consisting of

—CO$_2^\ominus$ and —SO$_3^\ominus$.

13. The process of claims 1 or 4 wherein the medium is selected from the group consisting of water with water-miscible solvents and organic polyhydroxyl compounds.

14. The process of claims 1 or 4 wherein the medium is water.

* * * * *